May 13, 1924.
O. STANKEY
ADJUSTABLE GEAR
Filed Sept. 24, 1923
1,493,827
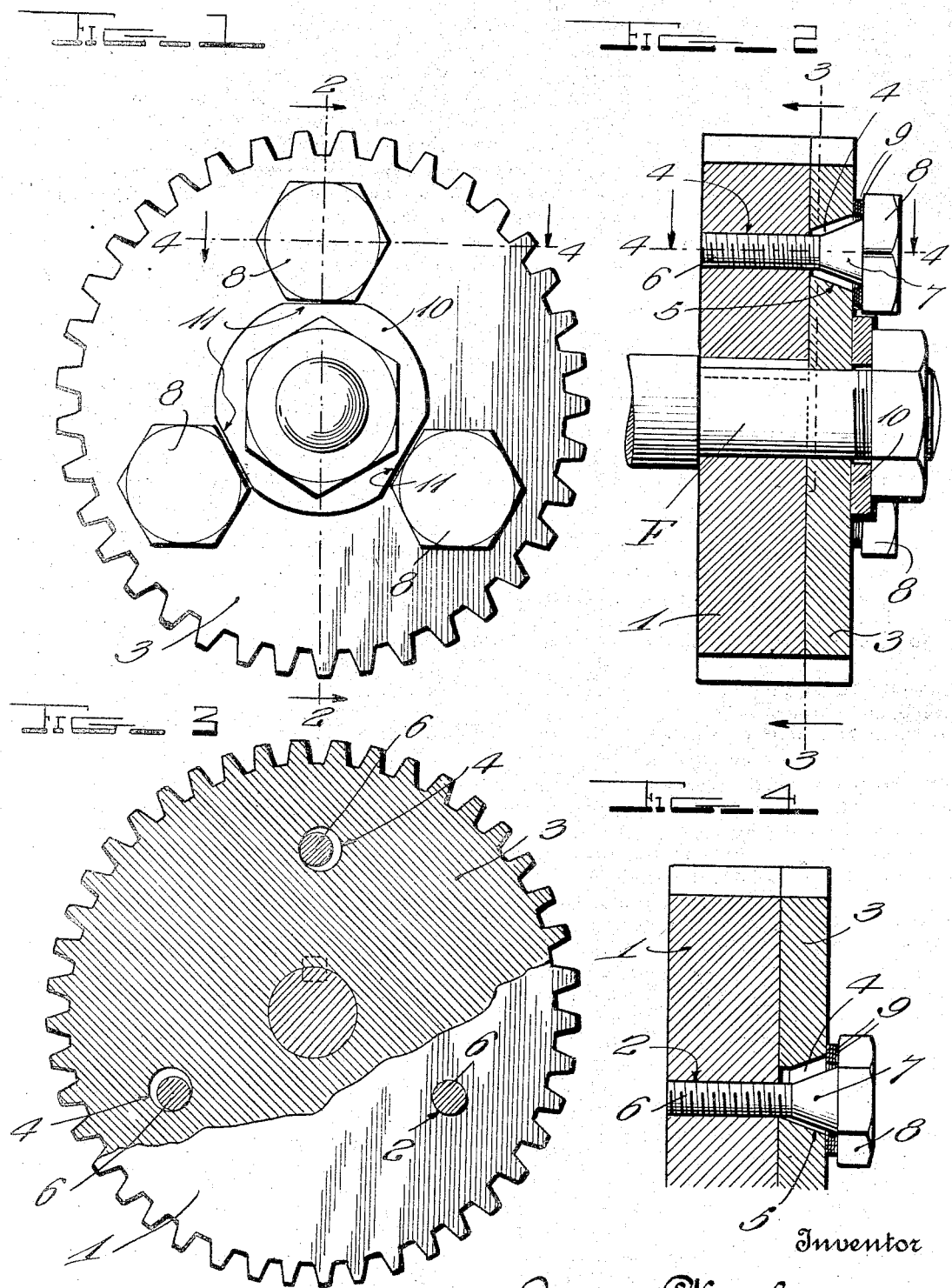
Inventor
Oscar Stankey Patented May 13, 1924.

1,493,827

UNITED STATES PATENT OFFICE.

OSCAR STANKEY, OF EAST ST. LOUIS, ILLINOIS.

ADJUSTABLE GEAR.

Application filed September 24, 1923. Serial No. 664,579.

*To all whom it may concern:*

Be it known that I, OSCAR STANKEY, a citizen of the United States, residing at East St. Louis, in the county of St. Clair and State of Illinois, have invented certain new and useful Improvements in Adjustable Gears; and I do declare the following to be a full, clear, and exact description of the invention, such as will enable others skilled in the art to which it appertains to make and use the same.

My invention relates to improvements in adjustable gears and has for its principal object to provide an exceptionally simple, yet effective gear, which may be advantageously used as one of the timing gears of an internal combustion engine, in such manner as to take up wear and prevent "backlash," which causes defective timing.

With the foregoing in view, my invention resides in the novel subject matter hereinafter described and claimed, the description being supplemented by the accompanying drawings.

Figure 1 is a side elevation of a gear constructed in accordance with my invention.

Figure 2 is a vertical sectional view on line 2—2 of Fig. 1.

Figure 3 is a vertical transverse section, partly in elevation, as indicated by line 3—3 of Fig. 2.

Figure 4 is a detail sectional view through a peripheral portion of the gear, as indicated by the lines 4—4 of Figs. 1 and 2.

In the drawings above briefly described, the numeral 1 designates the main section of the improved gear, which is of the same construction as an ordinary gear, with the exception that it is provided with a plurality of relatively small openings 2 spaced about its axis and disposed parallel therewith. Contacting flat against one side of the gear section 1, is a second section 3 which is preferably of less thickness than said section 1. The section 3 is provided with a plurality of comparatively large openings 4 which are substantially alined with the openings 2 but are slightly offset circumferentially therefrom. The openings 4 are preferably formed with inwardly tapered side walls 5.

Passing through the two sets of openings, are a number of fasteners 6 which may either be in the form of screws threaded into the openings 2, or in the form of bolts. The fasteners 6 are provided with conical portions 7 received in the relatively large openings 4 and in contact with the tapered walls 5 thereof, the point of contact with each opening 4, being only at one side of the conical portion 7. The fasteners 6 are also provided with heads 8 and a plurality of thin washers or shims 9 are clamped between said heads and the gear section 3.

By removing the fasteners 6 and taking off one or more shims of each set, and then replacing said fasteners, it will be seen that tightening of the latter will cause a slight circumferential shifting of the gear section 3 upon the main section 1. Thus, wear on the teeth of the improved gear and those of the meshing gear, are effectively compensated, which is exceptionally desirable when the gear is used in the timing mechanism of an internal combustion motor. Whenever an adjustment is made, it will be seen that the fasteners 6 not only effect such adjustment, but that they tightly clamp the sections of the gear in relatively adjusted position.

Any suitable provision may be made for locking the fasteners 6 against loosening, and when the gear is to be used upon a shaft, as indicated at F, a washer 10 may be clamped on the shaft with the gear, said washer having flat edge portions 11 to contact with the heads 8.

The device is extremely simple and inexpensive, yet is efficient and desirable and as excellent results may be obtained from the details disclosed, they are preferably followed. However, within the scope of the invention as claimed, minor changes may be made.

I claim:

1. A gear comprising two sections contacting flat against each other and both having peripheral teeth, one of said sections having relatively small openings spaced about its axis, the other section being formed with comparatively large openings substantially alined with but slightly offset circumferentially from said relatively small openings, threaded fasteners tightly received in said relatively small openings and having conical portions received in and contacting with one side of said comparatively large openings, said fasteners having heads at one side of the gear, and shims clamped between said heads and the gear.

2. A structure as specified in claim 1; said comparatively large openings having beveled sides for contact with said conical portions of said fasteners.

In testimony whereof I have hereunto affixed my signature.

OSCAR STANKEY.